Feb. 18, 1947.   C. M. KEARNS, JR   2,416,178
RESILIENTLY HINGED BLADE MOUNTING
Filed Sept. 19, 1944
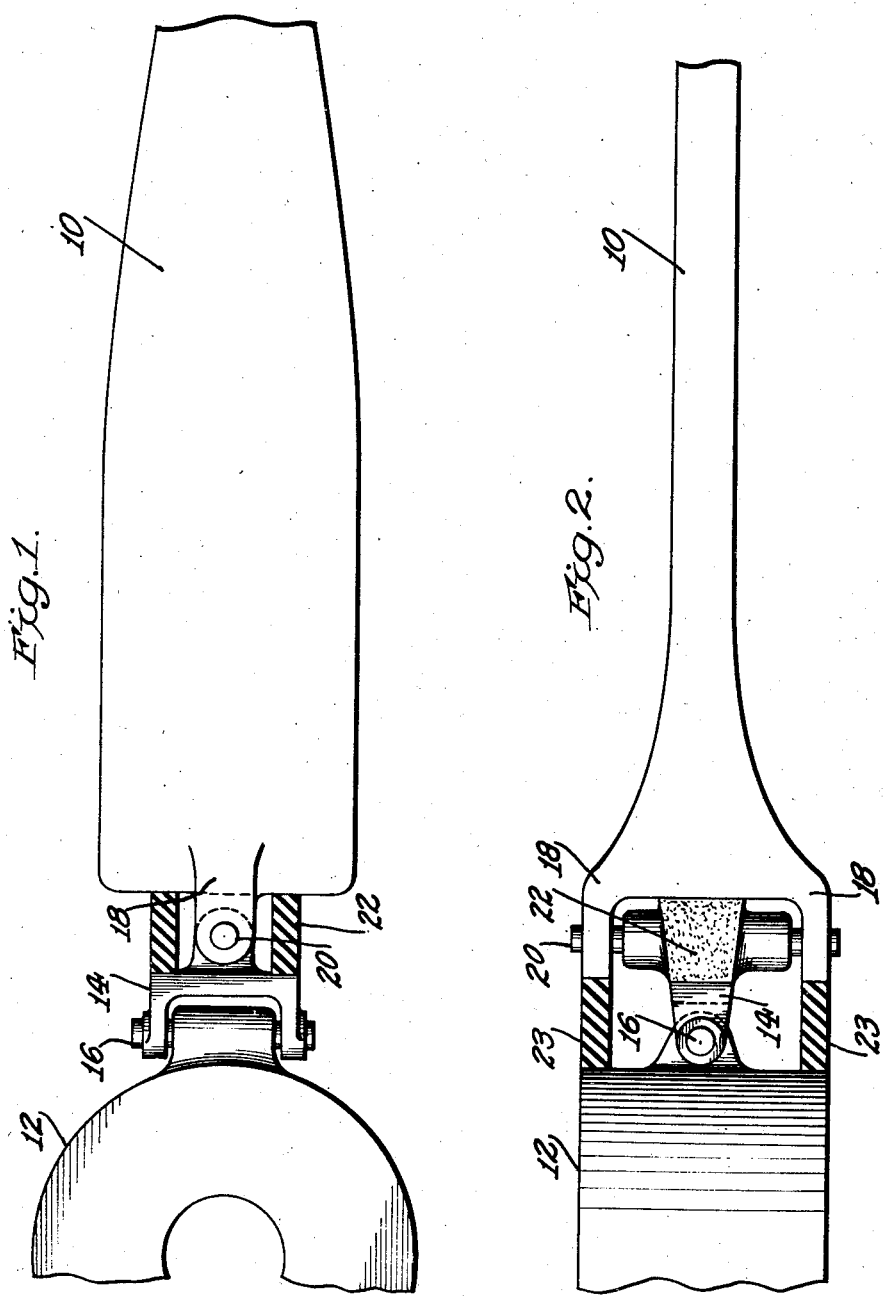
INVENTOR.
Charles M. Kearns, Jr.
BY
John C. Kerr
ATTORNEY Patented Feb. 18, 1947

2,416,178

UNITED STATES PATENT OFFICE 2,416,178

RESILIENTLY HINGED BLADE MOUNTING

Charles M. Kearns, Jr., West Hartford, Conn., assignor to United Aircraft Corporation, East Hartford, Conn., a corporation of Delaware Application September 19, 1944, Serial No. 554,809

4 Claims. (Cl. 170—164)

This invention relates to propellers for aircraft and has for its object to minimize or suppress certain vibrations which are peculiar to multi-bladed aircraft propellers.

Another object of the invention is to provide a multi-blade propeller having a resilient hinge mounting for limiting the gyroscopic deflections of the blades without raising the two lowest natural frequencies of the blades into the operating speed range.

Another object is to provide a propeller of the foregoing type having novel and improved details of construction and features of operation.

Various other objects and advantages will be apparent as the nature of the invention is more fully disclosed.

Although it is old in the art to hinge or otherwise pivot the blades of aircraft propellers to the hub in order to relieve them of bending stresses, mountings of this type have not heretofore been considered solely for their effect on blade vibration characteristics.

In my investigations of the effect of stiffness at the pivot of a hinged propeller blade on the natural frequencies of the first and second modes, and the response of such a blade to gyroscopic excitation, I have found that the blades may be hinged in such a way as to lower their lowest natural frequencies below the aerodynamic reactionless mode excitations, with the result that deleterious vibrations are suppressed or greatly reduced.

A feature of my invention resides in utilizing an articulated blade as a means of avoiding the occurrence of a 2P reactionless mode resonance within the operating range of a given propeller-engine combination by introducing variable amounts of flexibility in the form of a resiliently dampened hinge. By keeping the stiffness at the hinge low, the region of resonance of 2P excitation with the first natural frequency of the blade may be kept below the operating range, without having the second natural frequency resonance with 2P excitations occur within the operating speed range.

Although the novel features which are characteristic of this invention are set forth more in detail in the claims appended hereto, the nature and scope of the invention may be better understood by referring to the following description, taken in connection with the accompanying drawing forming a part thereof, in which certain specific embodiments have been set forth for purposes of illustration.

In the drawing:

Fig. 1 is a purely schematic plan view showing a propeller mounting embodying the invention; and Fig. 2 is a schematic side view of the propeller mounting shown in Fig. 1.

In the following description certain specific terms are used for convenience in referring to the various details of the invention. These terms, however, are to be interpreted as broadly as the state of the art will permit.

The propeller shown in the drawing may have any suitable number of blades 10 each of which is hinged, either singly or bi-directionally, to the hub 12. In the embodiment illustrated the blade 10 is universally hinged by means of a yoke 14 pivoted to the hub at 16, and the bifurcated arms 18 of the blade which are pivoted to the yoke 14 at 20.

According to a feature of the invention resilient damping elements, represented schematically as blocks of rubber 22, are mounted between the base or root of the blade 10 and the yoke 14. Similar blocks 23 are mounted between the bifurcated arms 18 of the blade 10 and the hub 12 as shown in Fig. 2, said blocks 23 being omitted in Fig. 1 in order to simplify the showing.

Although the damping members 22 and 23 are represented as blocks of rubber or other resilient material, it is to be understood that this is purely for purposes of illustration since springs and a wide variety of other elements may be employed for this purpose. Furthermore, various details in the drawing are purposely exaggerated in order to emphasize the relationship of the several parts.

The hinging described above, drastically reducing the angular or lateral constraint, or both the angular and lateral constraint, of the blade root, will lower the lowest natural frequency of the blade below the aerodynamic reactionless mode excitations and will raise the frequency of the first possible reactionless mode by a large factor compared to the one found with a conventional rigidly encastered blade.

However, the resilient members 22 and 23 are selected and proportioned to have sufficient stiffness to limit the gyroscopic deflections to a sufficient degree without raising the two lowest natural frequencies of the propeller blades up into the operating speed range. By proper design, as required by each particular installation problem, the blade vibration characteristics may be controlled and the deleterious vibrations peculiar to propellers of the above type may be minimized or suppressed.

Although certain specific embodiments of the invention have been shown and described for purposes of illustration it is to be understood that the invention is capable of various modifications and adaptations which will be readily apparent to a person skilled in the art. The invention is only to be limited in accordance with the scope of the appended claims.

The invention claimed is:

1. A propeller, comprising a hub, a yoke member pivoted thereto for movement about a predetermined axis, a blade pivoted to said yoke member for movement about an axis at substantially right angles to the first named axis, resilient vibration-dampening means interposed between said blade and said hub for absorbing relative vibrations therebetween about the first named axis, and other resilient vibration-dampening means interposed between said yoke and said blade for absorbing relative vibrations therebetween about the second named axis.

2. A propeller, comprising a hub, a yoke member pivoted thereto for movement about a predetermined axis, a blade pivoted to said yoke member for movement about an axis at substantially right angles to the first named axis, resilient vibration-dampening means interposed between said blade and said hub and uniformly disposed in respect to said first named axis for absorbing relative vibrations in both directions between said blade and said hub about said first named axis, and other resilient vibration-dampening means interposed between said yoke and said blade and uniformly disposed in respect to the second named axis for absorbing relative vibrations in both directions between said yoke member and said blade about said second named axis.

3. A propeller, comprising a hub, a yoke member pivoted thereto for movement about a predetermined axis, a blade pivoted to said yoke member for movement about an axis at substantially right angles to the first named axis, a pair of similar resilient vibration-dampening means interposed between said blade and said hub and similarly arranged on opposite sides of said first named axis for absorbing relative vibrations in both directions between said blade and said hub about said first named axis, and another similar pair of resilient vibration-dampening means interposed between said yoke and said blade and similarly arranged on opposite sides of the second named axis for absorbing relative vibrations in both directions between said yoke and said blade about said second named axis.

4. A propeller, comprising a hub, a yoke member pivoted thereto for movement about a predetermined axis, a blade pivoted to said yoke member for movement about an axis at substantially right angles to the first named axis, a pair of similar abutment portions formed as a part of said blade and uniformly disposed in respect to said first named axis, said abutment portions having surfaces substantially parallel to said first named axis, and resilient vibration-dampening means interposed between said blade and said hub for absorbing relative vibrations therebetween about said first named axis, said resilient vibration-dampening means comprising a pair of buffer blocks of rubber-like material extending between said surfaces of said abutment portions of said blade and parts rigid with said hub, said yoke member having a pair of abutment portions having surfaces substantially parallel with and uniformly disposed on opposite sides of the second named axis, and other resilient vibration-dampening means interposed between said abutment portions of said yoke and said blade for absorbing relative vibrations therebetween about said second named axis, the last named resilient vibration-dampening means comprising a similar pair of blocks of rubber-like material extending between said abutment portions of said yoke member and opposed surfaces formed on a part of said blade, all said resilient vibration-dampening means extending the entire distance between the portions with which they are associated and being so arranged with respect to their associated axes as to dampen vibrations in both directions about their respectively associated axes.

CHARLES M. KEARNS, Jr.

REFERENCES CITED

The following references are of record in the file of this patent:

UNITED STATES PATENTS

| Number | Name | Date |
|---|---|---|
| 1,802,648 | Heath | Apr. 28, 1931 |
| 1,980,169 | Cierva | Nov. 13, 1934 |
| 2,017,105 | Pecker | Oct. 15, 1935 |
| 2,245,251 | Chilton | June 10, 1941 |